United States Patent
Morley et al.

(10) Patent No.: US 9,450,943 B2
(45) Date of Patent: *Sep. 20, 2016

(54) METHOD AND APPARATUS FOR REMOTE CONNECTION

(71) Applicant: RealVNC Ltd, Cambridge, Cambridgeshire (GB)

(72) Inventors: Jason Barrie Morley, Cambridge (GB); Nicolas David Reeves, Cambridge (GB); Adam Greenwood Byrne, Cambridge (GB); Katarzyna Maria Czeczot, Cambridge (GB)

(73) Assignee: RealVNC Ltd, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,610

(22) Filed: Oct. 8, 2015

(65) Prior Publication Data

US 2016/0028712 A1 Jan. 28, 2016

Related U.S. Application Data

(63) Continuation of application No. 14/097,196, filed on Dec. 4, 2013, now Pat. No. 9,185,113.

(30) Foreign Application Priority Data

Apr. 10, 2013 (GB) .................................. 1306510.7

(51) Int. Cl.
*H04L 29/06* (2006.01)
*G06F 3/14* (2006.01)
*H04L 29/08* (2006.01)

(52) U.S. Cl.
CPC .............. *H04L 63/08* (2013.01); *G06F 3/1454* (2013.01); *H04L 63/0884* (2013.01); *G09G 2360/121* (2013.01); *G09G 2370/022* (2013.01); *H04L 63/0869* (2013.01); *H04L 67/20* (2013.01)

(58) Field of Classification Search
CPC ............... H04L 63/0884; H04L 67/20; H04L 63/0869; G06F 3/1454; G09G 2370/022
See application file for complete search history.

(56) References Cited

U.S. PATENT DOCUMENTS

| | | |
|---|---|---|
| 7,257,837 B2 | 8/2007 | Xu et al. |
| 8,347,365 B2 | 1/2013 | Jelatis et al. |

(Continued)

FOREIGN PATENT DOCUMENTS

| | | |
|---|---|---|
| EP | 1998506 | 12/2008 |
| EP | 2605471 | 6/2013 |

OTHER PUBLICATIONS

Great Britain Application No. GB1306510.7, Letter re Examination mailed Dec. 13, 2013.
Great Britain Application No. GB1306510.7, Search Report mailed Oct. 16, 2013.

(Continued)

*Primary Examiner* — Amir Mehrmanesh
(74) *Attorney, Agent, or Firm* — Sheppard, Mullin, Richter & Hampton LLP

(57) ABSTRACT

A system and method for establishing a virtual network connection between an initiating computing device operated by an initiator and a target computing device operated by a target so that one of said computing devices is able to control the other of said computing devices. The system comprises a third party proxy to which the computing devices are connected. The third party proxy receives a request for a virtual network connection to said target computing device from said initiating computing device and requests initiator credentials for said initiating computing device and target credentials for said target computing device. Said credentials are delivered to the respective computing device. The system also comprises a core node configured to receive the credentials from the respective computing device, authenticate the received credentials, and if said credentials are authentic, establish the virtual network connection between said initiating computing device and said target computing device.

5 Claims, 10 Drawing Sheets

(56) References Cited

U.S. PATENT DOCUMENTS

| | | |
|---|---|---|
| 8,732,805 B2 | 5/2014 | Kavantzas et al. |
| 8,935,706 B2 | 1/2015 | Ellis et al. |
| 9,008,316 B2 | 4/2015 | Acar et al. |
| 9,009,797 B1 | 4/2015 | Fox |
| 9,032,488 B2 | 5/2015 | Lee |
| 2009/0235342 A1 | 9/2009 | Manion et al. |
| 2009/0307600 A1 | 12/2009 | Arthur et al. |
| 2011/0023096 A1 | 1/2011 | Xiao et al. |
| 2011/0137809 A1 | 6/2011 | Klapheke |
| 2013/0091214 A1* | 4/2013 | Kellerman ............. G06Q 30/00 709/204 |
| 2013/0138822 A1 | 5/2013 | Hu et al. |
| 2014/0223525 A1 | 8/2014 | Fadida et al. |

OTHER PUBLICATIONS

International Application No. PCT/GB2014/050094, International Search Report and Written Opinion mailed Apr. 17, 2014.
Great Britain Application No. GB1306509.9, Search Report mailed Oct. 16, 2013.
Great Britain Application No. GB1306509.9, First Examination Report mailed Dec. 13, 2013.
Great Britain Application No. GB1306509.9, Second Examination Report mailed Nov. 14, 2014.
International Application No. PCT/GB2014/050095, Invitation to Pay Additional Fees and Partial International Search Report mailed Apr. 14, 2014.
International Application No. PCT/GB2014/050095, International Search Report and Written Opinion mailed Jul. 23, 2014.

* cited by examiner

US 9,450,943 B2

METHOD AND APPARATUS FOR REMOTE CONNECTION

CROSS-REFERENCE TO RELATED APPLICATIONS

This application is a continuation of U.S. patent application Ser. No. 14/097,196, filed on Dec. 4, 2013 and entitled "Method and Apparatus for Remote Connection," which claims the benefit of United Kingdom Patent Application No. GB1306510.7, filed on Apr. 10, 2013 and entitled "Method and Apparatus for Remote Connection," which are hereby incorporated by reference herein.

FIELD OF THE INVENTION

The present invention relates to a method and system for remote controlling and/or viewing a computing device.

BACKGROUND

It is known to use a first computer device to view and control a second computer device using a Virtual Network Computing (VNC) viewer application running on the first computer device (VNC viewer) and a VNC server application running on the second computer device (VNC server). The contents of the display of the second computer device are duplicated on the first computer device which is typically remote from the second computer device. The first computer device has an interface mechanism which allows the user to send user input events, such as pressing a physical key on the device, moving the mouse cursor or touching a touch screen input, to the second computer device being controlled. As will be appreciated, the form of data link and the nature of the computer devices can vary, depending on the situation being used.

For example, one reason for establishing such a connection is that the user of the second computer device may be experiencing a problem with their computer device and may wish to ask the user of the first computer device to assist with the problem by establishing the virtual network connection. Accordingly, the virtual network connection may be referred to as a helpdesk session because one person is able to "help" the other. Furthermore, the first computer device may be termed a customer support representative (CSR) device and the second computer device may be termed a subscriber device.

It will be appreciated that there are other reasons for screen sharing, e.g. collaboration or presentation. For example, it may be desirable to have screen sharing amongst networks of users. One common form of network which links different users is a social network and the different users may be friends within the social network. The term "friend" is used to indicate that each user is authenticated to the social network and that they have a relationship with each other via the social network.

The present system and method provide a mechanism to establish the connection between the first computer device and the second computer device, for example where the first and second computer devices are used by users who are connected via a social network or other third party network. The applicant has recognised the need for a mechanism for establishing the connection which is secure, efficient to host and easy for all parties to use.

SUMMARY OF THE INVENTION

According to a first aspect of the invention, there is provided a system for establishing a virtual network connection between an initiating computing device operated by an initiator and a target computing device operated by a target so that one of said initiating computing device and said target computing device is able to control the other of said initiating computing device and said target computing device, the system comprising:
a third party proxy to which the initiating computing device and target computing device are connected; the third party proxy being configured to:
receive a request for a virtual network connection to said target computing device from said initiating computing device;
request initiator credentials for said initiating computing device and target credentials for said target computing device with said initiator credentials being delivered to said initiating computing device and said target credentials being delivered to said target computing device; and
a core node which is configured to
receive the initiator credentials from the initiating computing device,
receive the target credentials from the target computing device which is paired with the initiating computing device,
authenticate the received credentials, and
if said credentials are authentic, establish the virtual network connection between said initiating computing device and a target computing device.

According to a second aspect of the invention, there is provided a method for establishing a virtual network connection between an initiating computing device operated by an initiator and a target computing device operated by a target so that one of said initiating computing device and said target computing device is able to control the other of said initiating computing device and said target computing device, the method comprising:
receiving from said initiating computing device at a third party proxy, to which the initiating computing device and target computing device are connected, a request for a virtual network connection to said target computing device;
requesting, using said third party proxy, initiator credentials for said initiating computing device and target credentials for said target computing device;
transferring said initiator credentials to said initiating computing device;
transferring said target credentials to said target computing device;
receiving, at a core node, the initiator credentials from the initiating computing device,
receiving, at the core node, the target credentials from the target computing device which is paired with the initiating computing device,
authenticating, at the core node, the received credentials, and
if said credentials are authentic, establishing the virtual network connection between said initiating computing device and a target computing device.

The third party proxy is connected to both the initiating computing device and target computing device and thus both the target and the initiator may be considered to have a relationship with the third party proxy. Preferably, the target and initiator also have a relationship with each other via the third party proxy. Said third party proxy is preferably configured to authenticate both said initiating computing device and said target computing device. In this way, both the target and initiator have greater confidence that they are communicating with the correct party. Moreover, this may be achieved using the authentication already provided by the third party proxy.

The core node is preferably separate from the third party proxy, for example, the core node may be a component in a hosted service which facilitates the establishment of the connection. The core node authenticates both the target and the user to provide another level of confidence that the connection is being established between the correct parties. The authentication by the third party proxy may be a first stage of authentication to ensure that no credentials are issued whereas the authentication by the core node may be a final stage of authentication to minimise any risk that the credentials have been intercepted by a man-in-the-middle attacker.

One scenario for this system is a helpdesk application which may be running on a helpdesk node. For example, the initiator may be experiencing a problem with the initiating computing device and wishes to ask the target to assist with the problem by establishing a virtual network connection with them so that the target can view and control the initiating computing device using their target computing device. Alternatively, the initiator may wish to offer assistance to the target and thus may wish to establish a virtual network connection so that the initiator can view and control the target computing device using the initiating computing device. In both cases, the virtual network connection may be referred to as a helpdesk session because one person is able to "help" the other. In both scenarios, the initiator and target typically do not have any software on their computer to enable the required connection.

In the helpdesk scenario, the initiator may be a subscriber to the services of the target who is a customer support representative (CSR). The third party proxy may thus be configured to request subscriber credentials for said initiating computing device and CSR credentials for said target computing device so that when said initiating computing device and said target computing device are connected, said target computing device is able to control said initiating computing device. Alternatively, the initiator may be a CSR who provides services to various subscribers one of whom is the target. The third party proxy may thus be configured to request CSR credentials for said initiating computing device and subscriber credentials for said target computing device so that when said initiating computing device and said target computing device are connected, said initiating computing device is able to control said target computing device.

One common form of network which links different users is a social network. Accordingly, the third party proxy may be configured to provide a social network and the users of the initiating computing device and the target computing device may be friends within the social network. The term "friend" is used to indicate that each user is authenticated to the social network and that they have a relationship with each other via the social network. Both users have confirmed the relationship and thus both users trust that the other is authentic.

The third party proxy may be configured to display, on a user interface, a list of targets with whom the initiator has a relationship via the third party proxy and receive a selection of a target from within said list. This is a convenient method for a user to select targets and provides the ability to establish a virtual network connection using an existing user interface with which the user is already familiar. The third party proxy may store public information for the initiator and/or targets. When a target is selected or just before the connection is established with the target, the user interface may display the public information for the target. This gives the initiator the confidence that they are about to establish a connection with the correct target. Similarly, the initiator public information may be displayed to the target.

The third party proxy requests initiator credentials for said initiating computing device and target credentials for said target computing device with said initiator credentials being delivered to said initiating computing device and said target credentials being delivered to said target computing device. The credentials are required to ensure that the correct parties are ultimately connected. The third party proxy thus assists in obtaining the credentials. Furthermore, the third party proxy may be configured (directly or indirectly) to deliver said initiator credentials to said initiating computing device and said target credentials to said target computing device. Thus, the third party proxy is facilitating communication of some or all of the credentials (in a secure manner as described above) around the system.

As set out above, typically the initiator and the target do not have the software to enable the connection. Accordingly, the third party proxy may be configured to deliver said initiator credentials to said initiating computing device and said target credentials to said target computing device together with application code which enables each of said initiating computing device and said target computing device to launch an application to enable said virtual network connection. In one preferred embodiment, the initiator credentials are bound into said application code delivered to said initiating computing device and the target credentials are bound into said application code delivered to said target computing device. In this way, neither the initiator nor the target have to enter the credentials themselves; simply downloading the appropriate application and running the application means that the credentials are entered and sent to the core node.

The system may further comprise an admin node which issues both credentials. The credentials may be received at a core node from the admin node so that the core node can authenticate the credentials received from the initiator and/or target. The admin node and core node are preferably separate devices to help maintain the integrity of the system. However, one or more node may be combined in a single device if required. The credentials typically are formed from a combination of information used to identify and authenticate the initiator and/or target. The initiator credentials may thus comprise an initiator identification and an initiator authentication. Similarly, the target credentials may comprise a target identification and a target authentication.

The admin node may be configured to check whether said initiating computing device is entitled to request said virtual network connection. For example, the admin node may check the status of an account of the initiator, e.g. monetary value, to see whether or not there is sufficient credit to pay for the connection.

The admin node may be configured to create a permanent credential for said initiator. Such a permanent credential may be useful if the system is to track information about the initiator, e.g. entitlement to use the service. If such a permanent credential is created for the initiator, the admin node may be configured to assign an anonymous credential to the target, e.g. from a pool of credentials.

As an alternative to the permanent credential for the initiator, the admin node may be configured to issue a credential pair comprising initiator credentials for an initiating device and target credentials for a target device which is paired with the initiating device. One method for pre-pairing the credentials is to assign the initiator credentials to one pool and the target credentials to another pool. The credentials may then be paired when they are issued by taking a credential from one pool and writing at least part, e.g. ID, from of a credential from the other pool into the first selected credential to form a paired record. The ID for the paired record may be considered to be an associated ID, i.e. an ID which associates the two credentials.

The admin node may be configured to create a plurality of pre-paired initiator and target credentials before issuing the credential pair. The pre-pairing of the initiator and target credentials may be arbitrary and the pre-paired credentials are preferably not initially associated with any computing devices. The pre-paired set of credentials may be associated with an initiating computing device and the corresponding target computing device when required, i.e. when they are requested from the admin service for use with both devices.

The database may be divided into a pool of subscriber devices and a pool of CSR devices. The associating step may comprise selecting a subscriber device and the pairing step may comprise writing at least part, e.g. ID, from the CSR credentials of a CSR device into the subscriber credentials for the selected subscriber device.

The admin node may be configured to reserve a batch of credential pairs (e.g. 100) and store the reserved batch in a local cache on said admin node. The admin node may be configured to send notification that a batch has been reserved to the core node. The core node may comprise a local cache which replicates the batch stored on the admin node. The admin node may be configured to associate said reserved batch with a fixed time period. The admin node may be configured to determine if said fixed time period has elapsed and if so, to discard the reserved batch. A notification of the discard may be transmitted to the core node.

As set out above, one option is to use a dedicated set of credentials for the initiator (i.e. the user originating the request for sharing devices) and an anonymous set of credentials for the target. In such an arrangement, the core node may not be able to validate that the initiator is paired with the correct target. Accordingly, at least one of said initiating computing device and said target computing device may verify that said credential for the other of said initiating computing device and said target computing device is correct. It will be appreciated that this additional verification by the initiating and/or target computing devices may be carried out regardless of the nature of the credentials, i.e. whether or not a permanent credential is used.

The virtual network connection established between said initiating computing device and said target computing device is preferably configured to ensure that at least part of the data, e.g. RFB data, transmitted over the connection is encrypted. Cryptographic data used to encrypt the data may also be used by said initiating computing device and said target computing device to verify that they are connecting to the correct device. For example, the initiating computing device may send cryptographic data to both the target computing device and the admin node/core node. On receipt of the cryptographic data from the initiating computing device, the admin node/core node may send further cryptographic data to the target computing device. The target computing device may then compare the cryptographic data received from the initiating computing device with the further cryptographic data received from the admin node/core node and only allow the connection if the two match.

It will be appreciated that the roles of the initiating computing device and target computing device may be reversed.

The initiating and target computing devices may be any computing terminal, for example desktops, PCs, servers as well as portable devices such as mobile phones, PDAs, laptops, tablets and similar devices. The devices are typically remote from one another. By remote, it is meant that the two devices are physically remote from each other. The devices may be located a considerable distance away from each other or may be located close by (e.g. both within an office). However, it is also possible for one or both of the devices to be a virtual machine in which case the devices to be running are on the same physical machine. The subscriber device may be termed a VNC server since it is sending information to be viewed on the CSR device. The CSR device may be termed a VNC viewer. These terms are used interchangeably throughout the description.

Any of the modules (e.g. helpdesk node, admin node, core node), databases or devices may be implemented in hardware for example as a general purpose computer modified (e.g. programmed or configured) by software to be a special-purpose computer to perform the functions described herein. The processors may be programmable processors, e.g. microprocessors.

The invention further provides processor control code to implement the above-described systems and methods, for example on a general purpose computer system or on a digital signal processor (DSP). The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which:

FIG. 1b is a block diagram of the hosted service component of the system of FIG. 1a;

DETAILED DESCRIPTION OF THE DRAWINGS

Figure 1A:
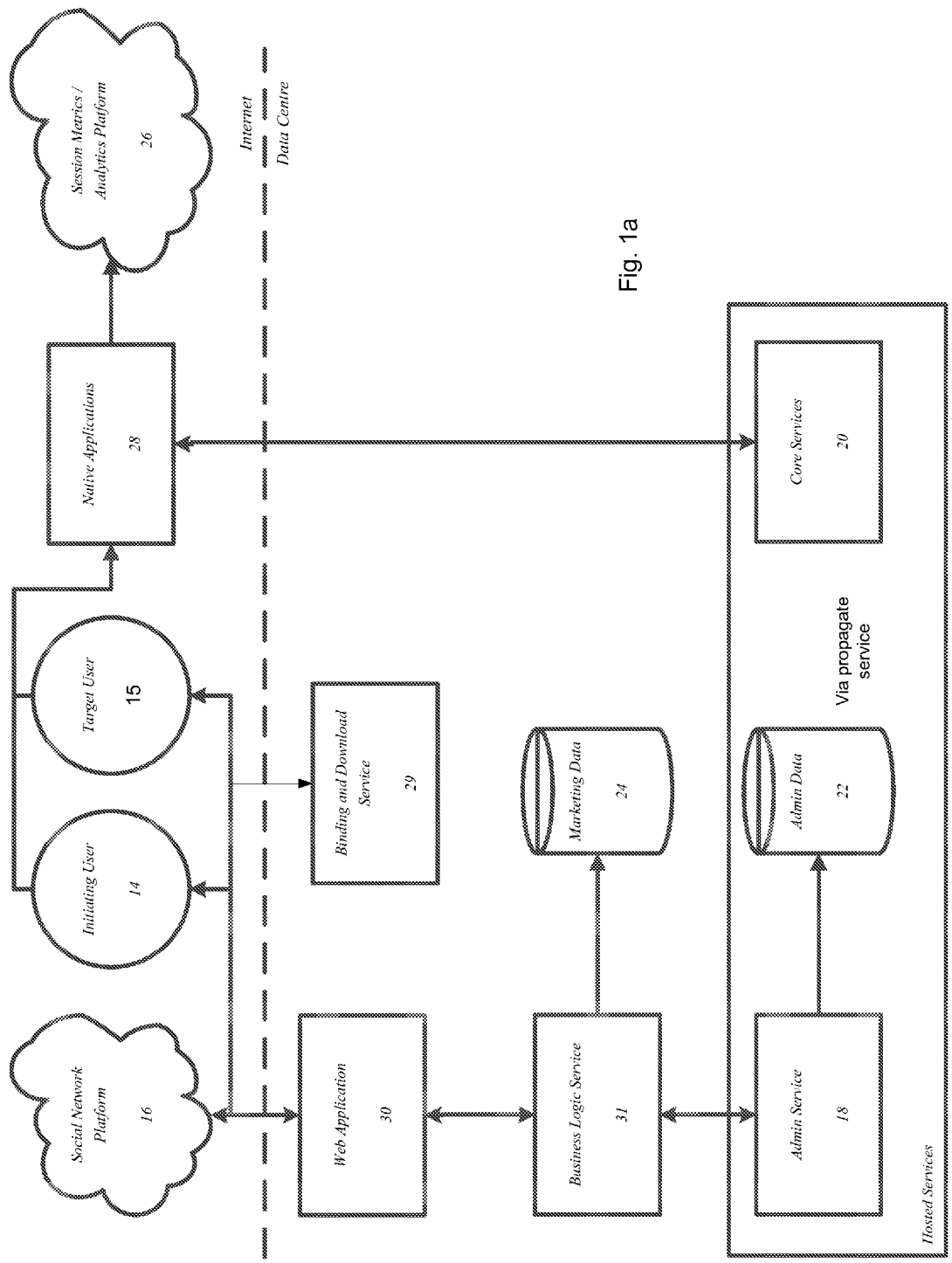
FIG. 1a is a block diagram showing the components of the system.

FIG. 1a shows the components of the system in which a social network platform is used to enable two "friends" on the social network to download the appropriate applications to connect their computing devices. The term "friend" is used to indicate that each user is authenticated to the social network (or other third party platform) and that they have a relationship with each other via the social network. Both users have confirmed the relationship and thus both users trust that the other is authentic.

One "friend" is a user 14 who initiates the connection and is thus on an initiating computing device and the other "friend" is a target 15 on a target computing device. The initiator 14 may be experiencing a problem with their computer device and wishes to ask the target to assist with the problem by establishing a virtual network connection with them to view and control their computer device. Accordingly, the virtual network connection may be referred to as a helpdesk session because one person is able to "help" the other. Furthermore, the target may be termed a customer support representative (CSR) able to provide assistance by viewing and controlling the device of the user and the user may be termed a subscriber. The terms CSR and subscriber are used to make it clear which party is in control of the other party's computer. In some scenarios, the CSR will be a service provided by a third party to which the subscriber has subscribed. However, the CSR may also simply be a friend who is able to assist the initiator without any subscription being required. Thus, the initiating computing device may be a subscriber device and the target computing device may be termed a CSR machine.

It will be appreciated that the connection can also be formed to give the initiator control of a target's computer. Thus, the initiator 14 who initiates the connection may be someone able to assist a "friend" and may be termed a CSR. Thus, the initiating computing device may be termed a CSR device and the target computing device may be termed a subscriber device. Accordingly, references below to CSR device and subscriber device may be replaced by initiating computing device and/or target computing device as appropriate. In both scenarios, the initiator and target typically do not have any software on their computer to enable the required connection.

FIG. 1a shows the initiator 14 who can be a subscriber or a CSR and who is connected to a datacentre of a helpdesk system, e.g. via the Internet. As explained in more detail below, the initiating user and the target have an existing relationship via a trusted third party communication platform which in this example is shown as a social network platform 16. The third party is connected to both the initiator and the target and the data centre, e.g. via the Internet. The third party has authenticated both the initiator and target, so they can be confident that they are communicating with the expected person. Where the platform is a social network platform, the initiator and target may be 'friends', and the helpdesk application integrates with an API provided by the social network. The initiator and target have both added the helpdesk application to their social network.

As shown in FIG. 1a, the helpdesk system is built on top of VNC Hosted Services which comprise a set of core services 20 and a set of admin services 18. The core services typically use industry standard approaches to allow two entities to find and connect to each other, traversing NAT and firewalls as appropriate to find the best means of connection. They are designed to provide an application-independent connection. The admin services provide an application programming interface (API) to allow applications to administer the system, including creating the principal credentials used to authenticate a Principal to the system, and control the rights that Principal has within the system.

The system is configured so that the initiator 14 (i.e. CSR or subscriber) can request a virtual network connection (also termed helpdesk session; with the terms being used interchangeably) from within the social network platform. The initiating user uses the social network platform to select the friend they want to target. If the initiator wishes to share their screen (i.e. to request a connection to receive help), they will use the social network platform to indicate "share my screen with the target X". If the initiator wishes to have access to the target's screen (i.e. to request a connection to give help), they will use the social network platform to indicate "view the screen of the target X". The helpdesk application handles the request by fetching valid CSR and Subscriber credentials from the Admin Service as explained in relation to FIGS. 3a and b. The appropriate credential information is distributed through the social network platform to the initiator and the target. As explained in more detail below, they may then be able to download VNC Viewer and Server applications respectively that have the appropriate credentials 'bound in' to the application, eliminating the need for the users to enter the credentials into the applications by hand.

Principal is a standard computer security term that means an entity that can be identified and authenticated. For example, in the VNC Hosted Services, a Principal may be a user (initiator or target), a machine/node, a process, etc.

For user Principals, identification may be achieved by use of a user name; for machines, identification may be done by means of a machine identifier, etc. Other entities may be identified in the normal ways familiar to one skilled in the art. The information used to identify Principals of any type is known as the ID.

Principals can be authenticated by a range of methods. Of most interest to the VNC Hosted Services are the password and certificate methods. Typically, user Principals are authenticated by use of a password, and machine and process Principals are authenticated by use of a public key. The skilled person would recognize that other authentication mechanisms may also be used, e.g. certificates may be used to both identify and authenticate a Principal. A Principal's ID may form part of a Principal's credentials.

The combination of information used to identify and authenticate a Principal of any type is known as the credentials. Information about a Principal in the hosted services is stored in a principal record.

The constituent services of VNC Hosted Services may be deployed onto nodes in a variety of ways, to meet different requirements on redundancy, capacity, and simplicity. In the simplest case, all admin and core services are run on a single node. This offers no redundancy in the event of failure, and a relatively small capacity as everything must run on one node. However, such a deployment is simple to set up and maintain, and may typically be used for evaluation.

Figure 1B:
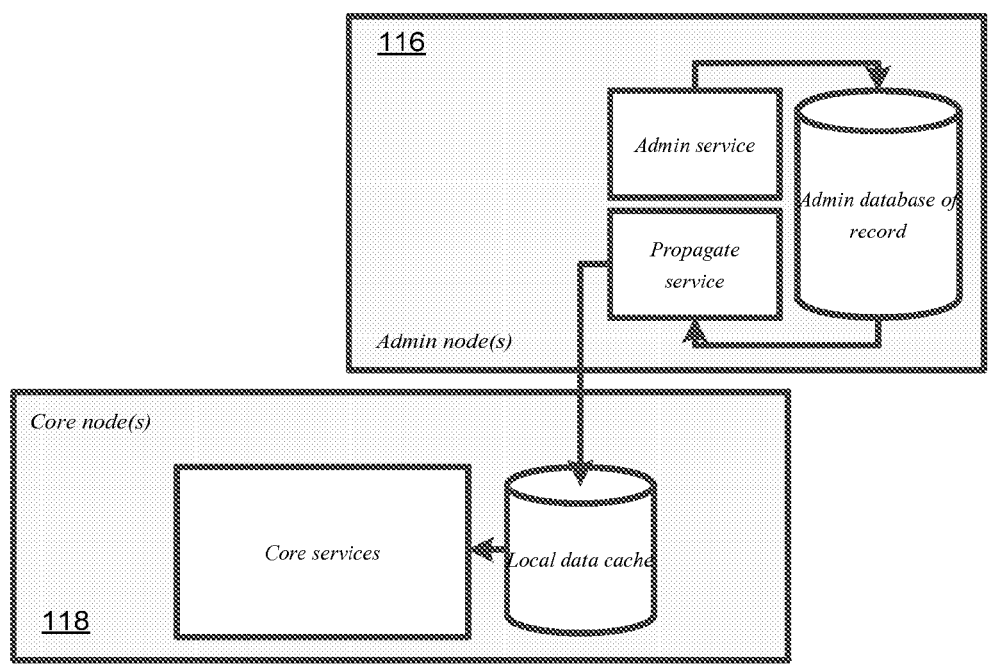

In another case, as shown in FIG. 1b, the admin services run on one node 116, and the core services run several separate nodes 118. The core nodes 118 house core services and a local data cache. The admin node 116 comprises an admin service, a propagate service and an admin database. The propagate service is connected to the local data cache of the core node(s) to propagate information from the admin services to the core services as described in more detail below. This configuration provides for a higher capacity, as the core services are the limiting factor when considering overall system capacity. This configuration also provides for redundancy in the core services, should one of the core service nodes fail. It does not provide for redundancy of the admin services, however. This type of deployment is more complex than the single node system, but not as complex to set up and maintain as some of the more elaborate deployments.

In another case, there are multiple admin nodes and multiple core nodes, bringing the associated benefits in capacity and redundancy, but at the cost of simplicity. In any of the above cases, the nodes may be distributed across a geographically wide area to provide better quality of service in different regions.

Figure 1C:
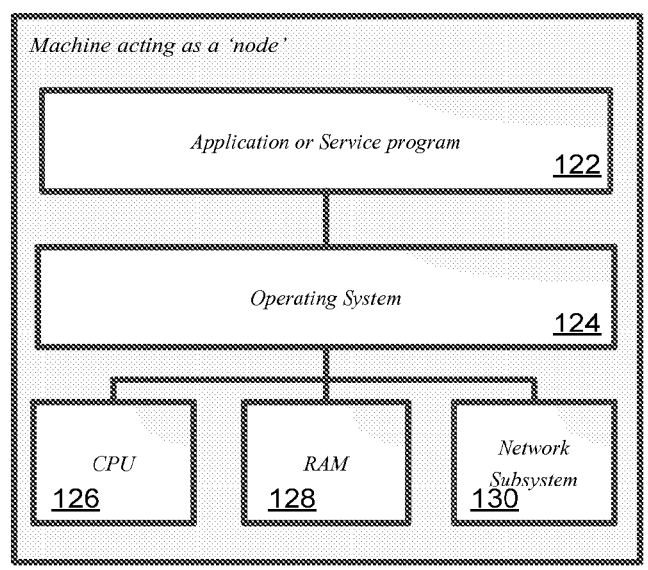
FIG. 1c is a block diagram showing the components of a node from FIG. 1b.

FIG. 1c shows the various components of any one of the nodes (i.e. the helpdesk application node, the core node(s) or the admin node). These components are merely illustrative of the typical components of such devices. It will be appreciated that the components may be housed together or separately. The application or service program 122 may be run on the operating system 124 which is connected to a central processing unit CPU 126, a RAM 128 and a network subsystem 130.

The core services and admin services are themselves comprised of named sub-services: The core services comprise bootstrap, discovery, rendezvous, connection broker and relay sub-services. The admin services comprise admin and propagate sub-services. These sub-services can themselves be deployed a node in any combination, from a node which runs a single service (e.g. relay) to a node which runs a mix of sub-services (e.g. propagate, bootstrap, and discovery), as is required to meet reliability and capacity goals. Any of the modules (e.g. helpdesk node, admin node, core node, or subservices), databases or devices may be implemented in hardware for example as a general purpose computer modified (e.g. programmed or configured) by software to be a special-purpose computer to perform the functions described herein. The processors may be programmable processors, e.g. microprocessors.

Furthermore, as shown in FIG. 1a, an admin database 22 is required as part of the hosted services. As explained in more detail below, this database stores admin data such as the credential information. It is also beneficial to record information about users of a system, for example to better tailor the system to their needs, and/or to inform decisions regarding hosting (e.g. if more users live on the east coast of the USA than the west coast, more capacity should be provisioned on the east coast, to give a better experience). To make the best use of this data you need to be able to run complex queries against it. Storing such data alongside the principal records in the admin database would be possible, but the nature of the data access would mean that the mission-critical admin data could not be stored as efficiently. As such, the marketing data may be stored in an optional separate marketing database 24, which can be better tailored to its uses.

Further optional features include a session metrics or analytic platform 26. This may be used in order to validate and improve our model of user behaviour by collecting information from the native applications 28 about the user's environment, and the use of the system with each screen sharing session. This information is gathered by the native applications 28 and submitted to a secure platform that records and aggregates this information. The platform 26 may also provide a user interface for the system owners to analyse the information. An example of such a service is Google Analytics.

Figure 3A:
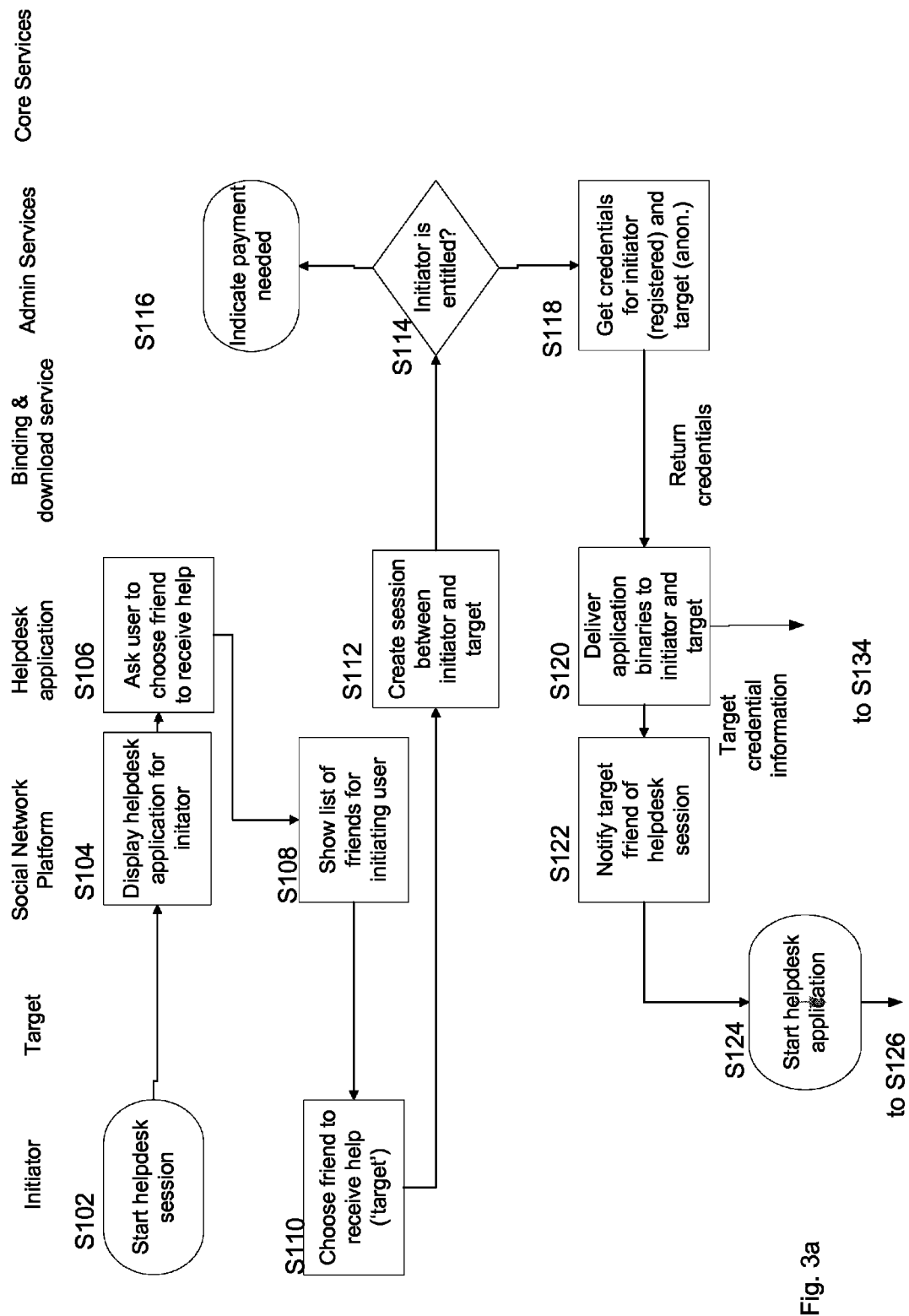
FIGS. 3a and 3b are a flow chart showing the interaction of the components of FIG. 1 in establishing a helpdesk session.
Figure 3B:
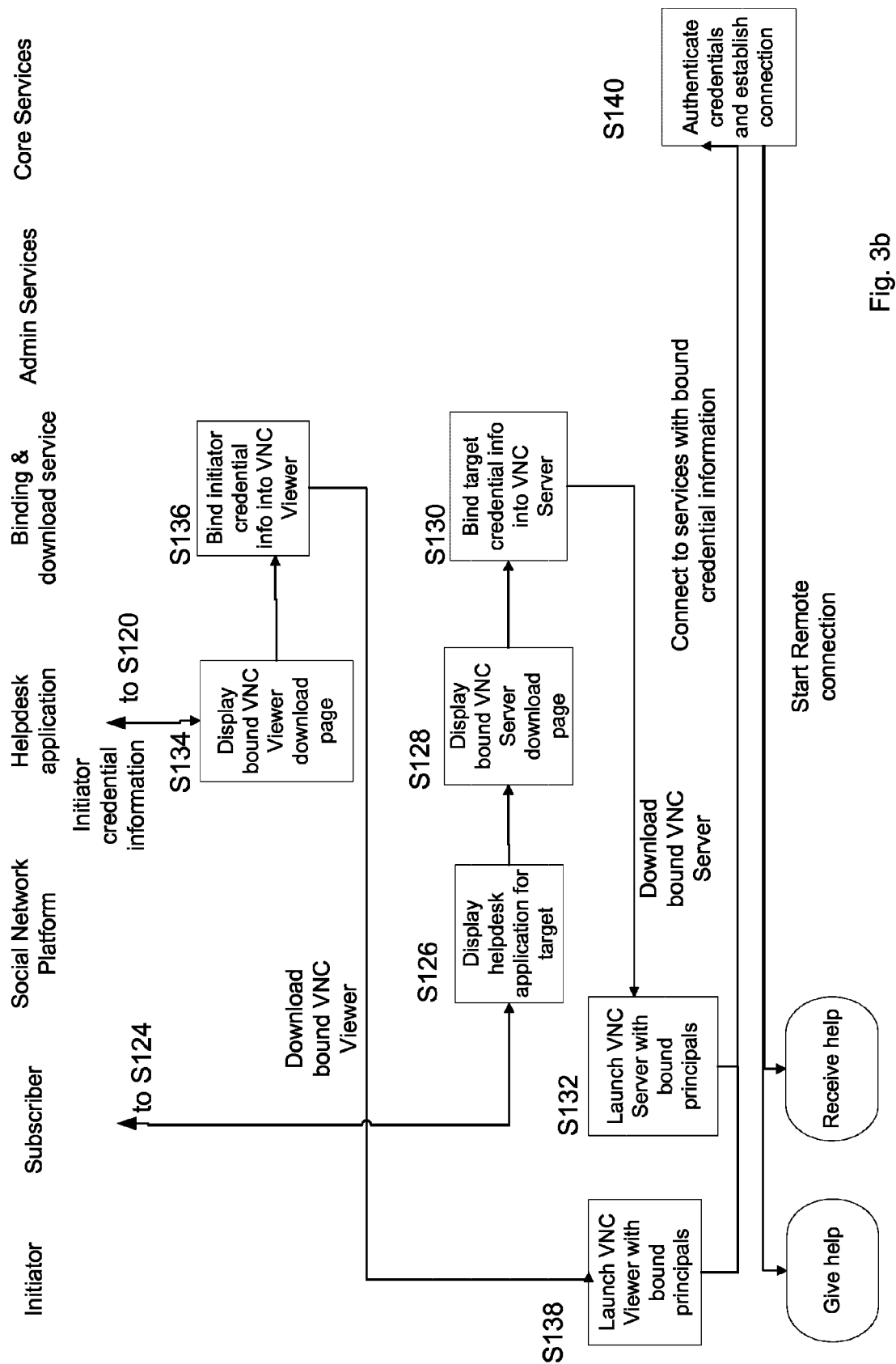

As explained in more detail in relation to FIGS. 3a and 3b, the data centre is running a helpdesk application which comprises three components, the 'binding and download service 29, the 'web application' 30 and the 'business logic service' 31 work together to provide content to be shown to the user 14 via the social network platform 16. These three components perform all of the tasks required to set up a screen sharing session. They are split into three components to make it more efficient to host for the required capacity but clearly could be provided in any number of components.

The 'business logic service' 31 handles all of the interactions with the hosted services and is thus connected to the admin service 18 of the hosted services to receive and transmit data. Thus, the helpdesk application is configured to ask the business logic service for the credentials and the business logic service is configured to ask the admin service for the credentials. The business logic service 31 also deals with all of the state management. The 'web application' 30 deals with all of the social network platform interactions, and the user interface. Accordingly, it is connected to both the social network platform and the business logic service to receive and transmit data. The 'web application' 30 can be made stateless, which allows more capacity to be added by adding more instances (machines running the same software), and balancing the load between them. If it had to keep track of state, there would need to be more complexity with keeping track of the state of each user and sharing that between instances.

Figure 2:
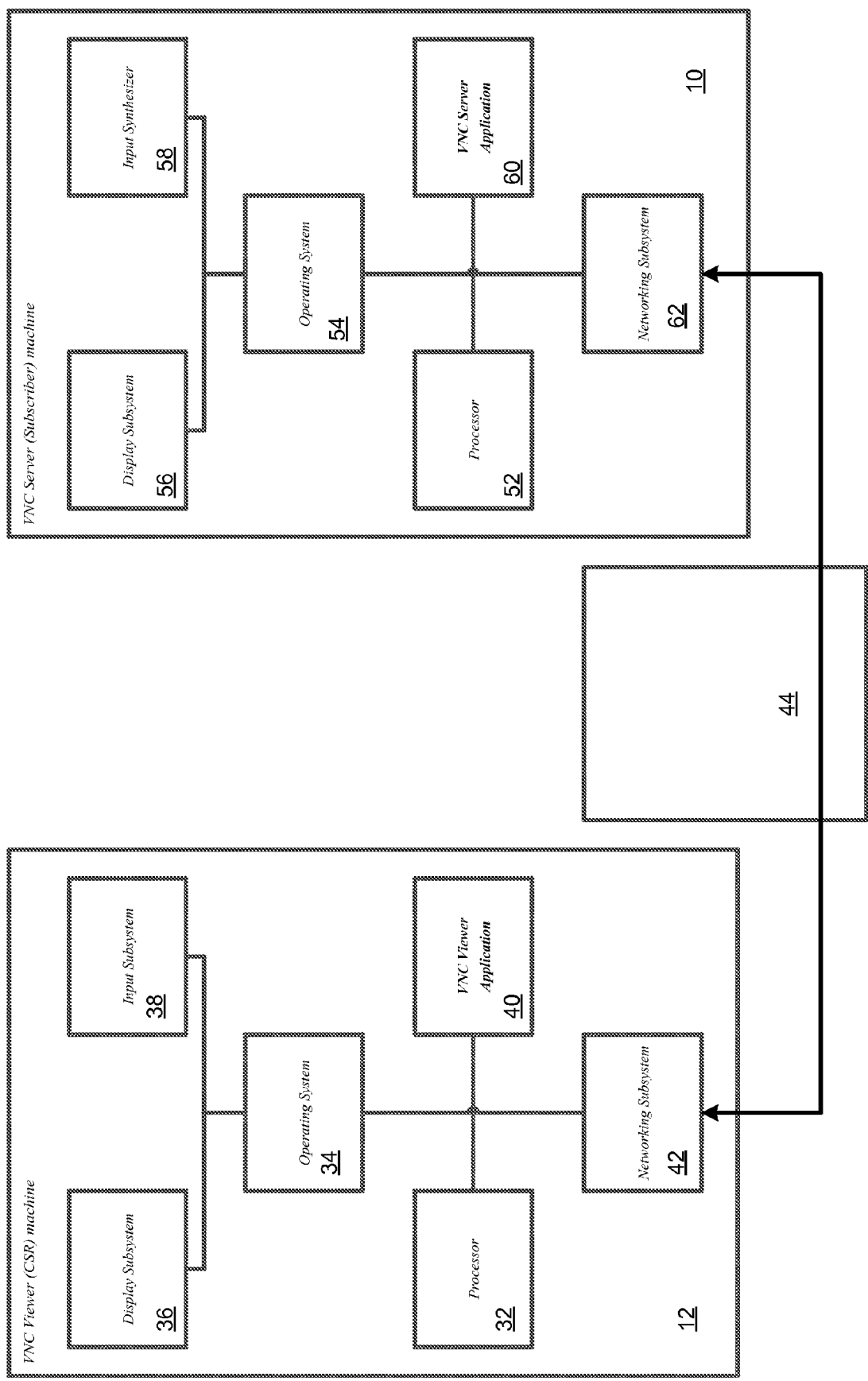
FIG. 2 is a block diagram showing the components of a subscriber machine and a customer support representative machine.

As explained in relation to FIGS. 3a and 3b, the social network platform is used to streamline credential transfer and entry of credential details to enable two "friends" to connect screens. Once the "friends" are connected, one computer device is able to view and control the other computer device using a Virtual Network Computing (VNC) viewer application running on one computer device (VNC viewer) and a VNC server application running on the other computer device (VNC server). The first computer device may be termed a customer support representative machine and the second computer device may be termed a subscriber machine. The two machines are typically remote from one another, i.e. physically separated, and thus one machine may be termed a local device and a second machine a remote device. FIG. 2 shows the various components of the subscriber machine 10 (remote device) which is connected via a connection 44 to the customer support representative machine 12 (local device). The connection 44 may be a relayed connection via a hosted service or a direct connection which is brokered by the hosted service.

The CSR machine 12 comprises a processor 32 (e.g. microprocessor), an operating system 34, an input subsystem 38, a display subsystem 36 and a networking subsystem 24 connected to the connection 44. The subscriber machine 10 comprises a processor 52, an input synthesiser 58, a display subsystem 56 and a networking subsystem 52 connected to the connection. A VNC server application 60 is running on the subscriber device to capture an image of the display subsystem 56 and send it via the connection to the local device; thus the subscriber device may be termed a VNC server. A corresponding VNC viewer application 40 is running on the CSR device processor 32 to receive the image of the display via the networking subsystem 42 and output it on the CSR display subsystem 36; thus the CSR device may be termed a VNC viewer.

The subscriber device comprises an input synthesiser 58 to input instructions from a client, e.g. cursor (pointer) movements or other inputs. Thus, cursor movements on the CSR device can trigger cursor movements on the display of the subscriber device. The input synthesiser 58 together with the VNC server application of the subscriber device translate such cursor movements into events on the subscriber device.

FIGS. 3a and 3b show one method for establishing a connection between the subscriber machine and a CSR machine (i.e. between an initiator and a target). It is assumed before initiating the steps of FIGS. 3a to 3b that both the initiator and target have added the helpdesk application to their social network. In summary, the system is configured so that the initiator (who may be a CSR or Subscriber) can request a virtual network connection (e.g. a helpdesk session) from within the social network platform. The helpdesk application handles the request by fetching valid credentials from the Admin Service. The appropriate credential information is distributed through the social network platform to the initiator and the target, who may then able to download VNC Viewer and Server applications that have the relevant credentials bound-in respectively.

Before describing the methods in detail, it is helpful to understand a naïve approach to how a subscriber machine and a CSR machine may be connected.

One naïve approach to establishing a connection between a CSR and a subscriber they've never contacted before has the following steps:
1. CSR has a VNC Viewer, and either has existing credentials, or requests new ones. They use them to connect and authenticate themselves to the hosted services.
2. CSR requests a new credential to give to the subscriber.
3. CSR communicates subscriber credentials to the subscriber. CSR initiates connection, and waits for subscriber to accept it.
4. Subscriber downloads a VNC Server from the CSR's organization that knows how to find the hosted services instance.
5. Subscriber types provided subscriber credentials into their VNC Server, which connects and uses them to authenticate with the hosted services and accept the waiting connection from the CSR.
6. Sometime after the helpdesk session, temporary subscriber credentials are removed.

The main drawback if the CSR initiates the connection is that if the subscriber credentials are intercepted, an attacker can spoof the CSR and connect into the VNC Server on the subscriber's machine, and take control of the user's machine.

FIGS. 3a and 3b are a flowchart showing how the social network platform is used to authenticate users of the system and to allow credential information to be transferred via the social network. In the example shown in FIGS. 3a and 3b, the helpdesk session is initiated by a CSR to allow a subscriber who is a friend in the CSR's social network to receive help from the CSR. Alternatively, the helpdesk session could be initiated by a subscriber to allow a CSR to give help to the subscriber.

It will also be appreciated that a social network platform is just one example of a third party platform which can be used. All that is required is that the CSR and subscriber who will ultimately be connected both have an existing relationship with the third party platform. This ensures that the platform can authenticate both parties so that it is confident that it is communicating with the expected person. Similarly, the helpdesk application is registered with the platform and can thus be trusted by both CSR and subscriber via the same mechanisms. Thus the third party platform is acting as a proxy to facilitate the helpdesk session.

The first step in the method is for the initiator to start the helpdesk session (S102). This action triggers the social network platform to interact with the helpdesk application to display an interface for the helpdesk application to the initiator (S104). The interface prompts the initiator to choose a friend, i.e. someone to whom they are connected, in their social network to receive help (S106). If the initiator was a subscriber, it will be appreciated that at this step, the initiator would be prompted to choose a friend who could act as a CSR to give the required help. To assist the initiator in choosing a friend, the social network platform provides a list of suitable friends (S108). Where the initiator is a CSR, the list of friends will include one or more subscribers who have an existing relationship with the social network platform. Where the initiator is a subscriber, the suitable friends include one or more CSRs who have an existing relationship with the social network platform.

At step S110, the initiator chooses a friend also termed a target. This selection prompts the helpdesk application to set-up a session between the initiator and target (S112). The session is created between both parties by the end user downloading the appropriate VNC Viewer or VNC Server application, running the application, entering credential information which validates the end user to allow the application to be used. The helpdesk application thus needs to supply the Viewer/Server binaries for the CSR/subscriber to download. Credential information also needs to be supplied to the end users. In the present example, this is provided by the helpdesk application including the credential information with the binaries so that a user (initiator or target) does not need to separately enter the credential information. In other words, the credentials can be bound, for example by:
  Including information in the filename
  Embedding the data into the binary, just before it is delivered
  Other mechanisms which will be well known to someone with experience in the art This enhanced functionality is significant for the usability of the software. A system in which an initiator (and target) have to enter credentials is possible but not ideal.

It is noted that in this context, the term binary is being used as the computer file which is encoded in the appropriate form for computer storage and processing. It will be appreciated that the binding process can be done by the helpdesk application, by a web application which is providing the content to the social network platform or by a separate process for reasons of speed and reliability. The binding process is also not limited to credential information. Other information, e.g. identifiers for identifying users within the social network platform could also be bound to the binaries. Such identifiers could be used as part of the mechanism for verifying the connection is being made by the expected parties. A skilled person may also bind other information.

It will also be appreciated that it would also be possible for the helpdesk application or the admin node to send the credential information separately from the binaries. However, in the example of FIGS. 3a and 3b, the helpdesk application contacts admin services to obtain the credential information so that they can be bound to the binaries and delivered to the appropriate user.

It is noted that the helpdesk application may be connected to another system to deliver the credentials (whether bound to the binaries or not). For example, the delivery could be via an instant messenger network. The credentials may be sent to the user via an instant message. In the case of enhanced functionality, a user could click a link in the instant message to launch the VNC viewer/server with the appropriate credentials.

Steps S114 and S116 are optional steps which allow the system to charge for use of the service if this is desired. As the request is sent form the helpdesk application to the hosted services, the admin services checks whether or not the initiator is entitled to use the application (S114) (i.e. entitled to have a virtual network connection). If a payment is required before the initiator is entitled to use the service, the admin services indicates that a payment is required (S116). The indication may be done using known mechanisms, e.g. by causing the social network platform to initiate a payment interface.

Once it is established that the initiator is entitled to request a helpdesk session, the admin services obtains a set of credentials for the initiator and the target (S118). The set of credentials could be a paired set as described in more detail below. However, paired credentials may not be ideal, for example, where entitlement to use the service is being tracked. This is because such a scheme uses a different pair of credentials for each connection and thus these credentials cannot be used to store entitlement information for a particular user. This can be solved by introducing a third principal record to track entitlement. Such a record can be stored in a separate non-propagating database which is accessed by the admin services. There is no need for the record to be propagated to other nodes within the hosted service because it is only used by the admin services to check entitlement and propagation of this information would be an unnecessary load on the system.

In the example of FIGS. 3a and 3b, an alternative method of allocating a set of credentials is used. The initiator is assigned a permanent credential. Information about entitlement, including payment where required, is stored within each permanent credential record which is associated with each initiator. The admin services can use the entitlement information within this record at step S114 above although this is an optional step. The billable event (if charges are imposed) could be the act of requesting the connection between the initiator and target. In general, it is the initiator and not the target who will be charged for the service and thus the payment information will only be required for the initiator. In these circumstances, the target may be assigned a credential from a pool of anonymous users and thus entitlement information for the target is not included within the credential. Using such permanent credentials for the initiator avoids the need to maintain a separate data store for entitlement information and therefore makes deployment and management more affordable.

It is noted that where an anonymous credential is used for the target, the responsibility for checking that the viewer and server are the expected ones falls to the software at the endpoints because the hosted services cannot be relied upon to enforce connections only between a pair from the pool. This is described in more detail in relation to FIGS. 5 to 7 below.

The Admin services returns the credentials to the helpdesk application which sends the application binaries (i.e. VNC Viewer and VNC server respectively) to the initiator and target (S120). The social network platform preferably is involved in communicating some or all of the information to the target. For example, as shown in FIG. 3b, the credential information for the target is sent to the social network platform. This prompts the social network platform to send a notification to the target that a friend has requested a helpdesk session (S122). The target may choose to accept or decline the offer of a helpdesk session. If they opt to start the helpdesk application (S124), the helpdesk application is displayed on the social network platform for them (S126).

The social network platform then sends the credential information back to the helpdesk application which prompts the helpdesk application to display the download page for the appropriate application binary (S128) to the target, e.g. via the social network platform. In this case, the appropriate binary is the VNC Server but it will be appreciated that if the target was a CSR, the appropriate binary would be the VNC Viewer. As explained above, the credential information may be beneficially bound into the binary to improve the user experience. Accordingly, at step S130, the target credential information is bound into the VNC server binary by a binding and download service. The target then downloads the bound VNC Server (or VNC viewer as appropriate) and launches the VNC server with bound credentials at step 132. In this example, only the credential information not the binary (nor a bound binary) is communicated between the helpdesk application and the social network platform. However, it will be appreciated that this is only one option and the bound binary could be communicated between the helpdesk application and the social network platform.

The target is now ready to be connected to the initiator. Given that the initiator started the helpdesk session, the initiator already is connected to the helpdesk application. Accordingly, once the credential information for the initiator is received at the helpdesk application, it displays the appropriate download page to the initiator (S134). In this case, a VNC Viewer application is to be downloaded but if the initiator was a subscriber, the application to be downloaded would be a VNC Server application. As explained above, the credential information may be beneficially bound into the binary to improve the user experience. Accordingly, at step S136, the initiator credential information is bound into the VNC viewer binary by a binding and download service. The initiator then downloads the bound VNC Viewer (or VNC server as appropriate) and launches the VNC Viewer with bound credentials at step 138.

Launching the VNC Viewer and VNC Server applications generates a connection between the users and the hosted services. As shown in this example, the core services authenticate the principals by checking the credential information received from both the initiator and the target (S140). If the information is validated, the control session is started so that the CSR can give help and the subscriber can receive help.

In the method described in FIGS. 3a and 3b, the credentials are supplied to the helpdesk application by the admin node from its cache but are authenticated by a core node. The principal records are preferably created using the admin service. If all core nodes continually have to check a single system of record to see if provided credentials are valid, this introduces a bottleneck and a single point of failure. Accordingly, changes are propagated out to the relevant core nodes when a change is made to a principal record with the admin service. Such changes take time to propagate outwards and this may cause a difficulty because often the new principal record may be needed very shortly after it is created.

Figure 4:
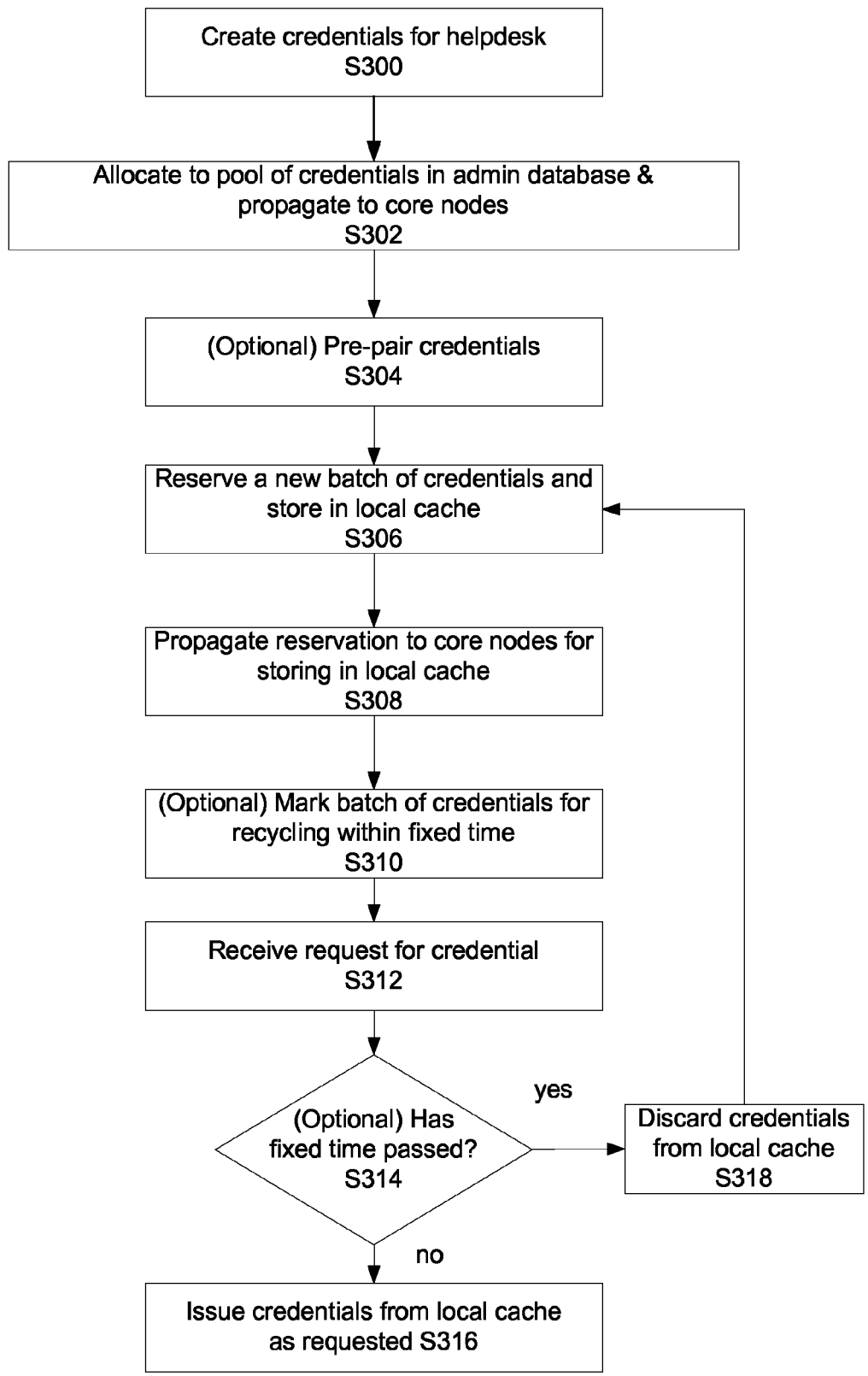
FIG. 4 is a flow chart showing the steps to create credentials for a subscriber and a CSR.

FIG. 4 sets out the steps at the admin node which provide an efficient architecture without an expensive central database. A key feature is that the credentials and their associated records are created (S300) and then assigned to a pool of credentials for use by helpdesk in advance (S302). These credentials then have plenty of time to propagate to the relevant nodes before they are needed, and can be supplied to the helpdesk application immediately when they are needed.

An optional feature is set out at step S304 in which the credentials are pre-paired. As explained in relation to FIGS. 3a to 3b, pre-pairing credentials may not be desirable where entitlement to use the service is checking, e.g. to check whether or not a user has paid for the service. Nevertheless, pre-pairing credentials may still be useful in other circumstances.

One method for pre-pairing the credentials is to assign the subscriber credentials to one pool and the CSR credentials to another pool. The credentials may then be paired when they are issued by taking a principal record from one pool and writing at least the ID of a principal record from the other pool into the first selected principal record to form a paired record. The ID for the paired record may be considered to be an associated ID, i.e. an ID which associates the two principals. However, such a method requires an expensive write each time pairing occurs.

An alternative method is to pair the credentials based on the number of their ID to further avoid writes that associate Subscriber and CSR Principals. IDs may thus have a prefix-number-suffix form, where the prefix and/or suffix identifies whether the associated Principal is a subscriber-side or CSR-side Principal. Thus if you already know the Subscriber ID, this form makes it possible to discover the CSR ID to connect to. In other words, one Principal is simply allocated credentials from a pool and the ID of the related Principal can be inferred from an index (although CSR authentication information is still recycled as explained below). This guarantees they will always be used in consistent pairs, and so has the effect of allowing the relevant access control to be enabled as well. The access control only allows principals to communicate via the hosted services only with their paired counterpart. This guards against potential spoofing attacks.

Another optional feature is set out at steps S306 to S318. The admin service reserves a batch of credentials (e.g. 100 credentials) from the hosted services pool in advance, and places them in a local cache to issue/assign to Principals on demand. The batch of credentials are allocated in one database transaction which means that the cost per reservation is greatly reduced because the database transaction overheads are a major part of the cost of the writes. The batch of credentials are stored in a local cache.

At step 308, an indication that the batch has been reserved is propagated to the core nodes for storing in the local caches of the core nodes. In this case, the local cache is a replicated copy of the administration data which is used for authentication purposes. It is a different local cache to the local cache described above in which 100 credentials are stored ready to be issued to the helpdesk application. This means we don't have to get all the relevant nodes to agree in a very short time frame that a new credential has been registered, meaning that fewer system resources are required for the same level of service. This is a classic example of the pattern of widening the allowed consistency window in order to improve efficiency/scalability.

Authentication information for credentials in the pool should be changed/recycled after they have been used. It is possible to continue to use the same credentials but this opens up a security problem because an attacker can re-use credentials that haven't expired to act as a valid user of the system without any limit on how long he can use them. An optional enhancement to achieve efficient recycling is described at step S310. The action that reserves a batch of credentials will mark that batch in the core services as eligible for recycling a fixed time, e.g. a configurable number of hours, after they were reserved. If the credentials are used after they have been recycled, the VNC server/viewer will fail to connect to the hosted services and the CSR has to try again with a new session. The number of principals in the batch should be sized to ensure that the time between issue and recycle is significantly longer than any reasonable amount of delay between the session request, and the session starting.

Thus when the admin node determines that a request for a credential has been received (S312), the first step is determine whether or not the fixed time has elapsed (S314). This is because the reserved credentials only have a fixed time in which they can be issued from the admin services' cache before they become stale (i.e. their authentication information is reset in the core services). If the credentials in the admin service cache become stale before they have all been issued, they are discarded (S318) and a fresh batch is be reserved from the core services. Thus, the system loops back to step S306.

If the credentials are still valid, at step S316 credentials are then allocated by the admin service from an in-memory cache, eliminating an additional write cost beyond the batch reservation. The credentials within a reserved batch are issued in a random order to reduce predictability.

The act of reservation triggers the recycling process in the core services that sets new passwords for eligible credentials. Recycling considers those credentials least likely to be allocated soon and least likely to still be in use. If we consider credentials to be arranged around a circle, the reservation of a batch of credentials at one side of the circle will trigger the recycling of credentials on the opposite side of the circle. In practice, each batch of reservations will do slightly more recycling than the batch size to ensure progress is made against any backlog, without doing too much work at once.

As explained in relation to FIGS. 3a and 3b, one option is to use a dedicated set of credentials for the initiator (i.e. the user originating the request for sharing devices) and an anonymous set of credentials for the target. The principal within the dedicated set of credentials is permanently associated with the user. However, the password is auto-generated and recycled periodically so that it will become invalid after a day or so. The principal for the target is allocated from a pool and is typically invalidated after a few hours. In such an arrangement, the hosted services cannot validate that the initiator is paired with the correct target. However, authentication can still take place as explained in FIGS. 5 to 7.

Figure 5:
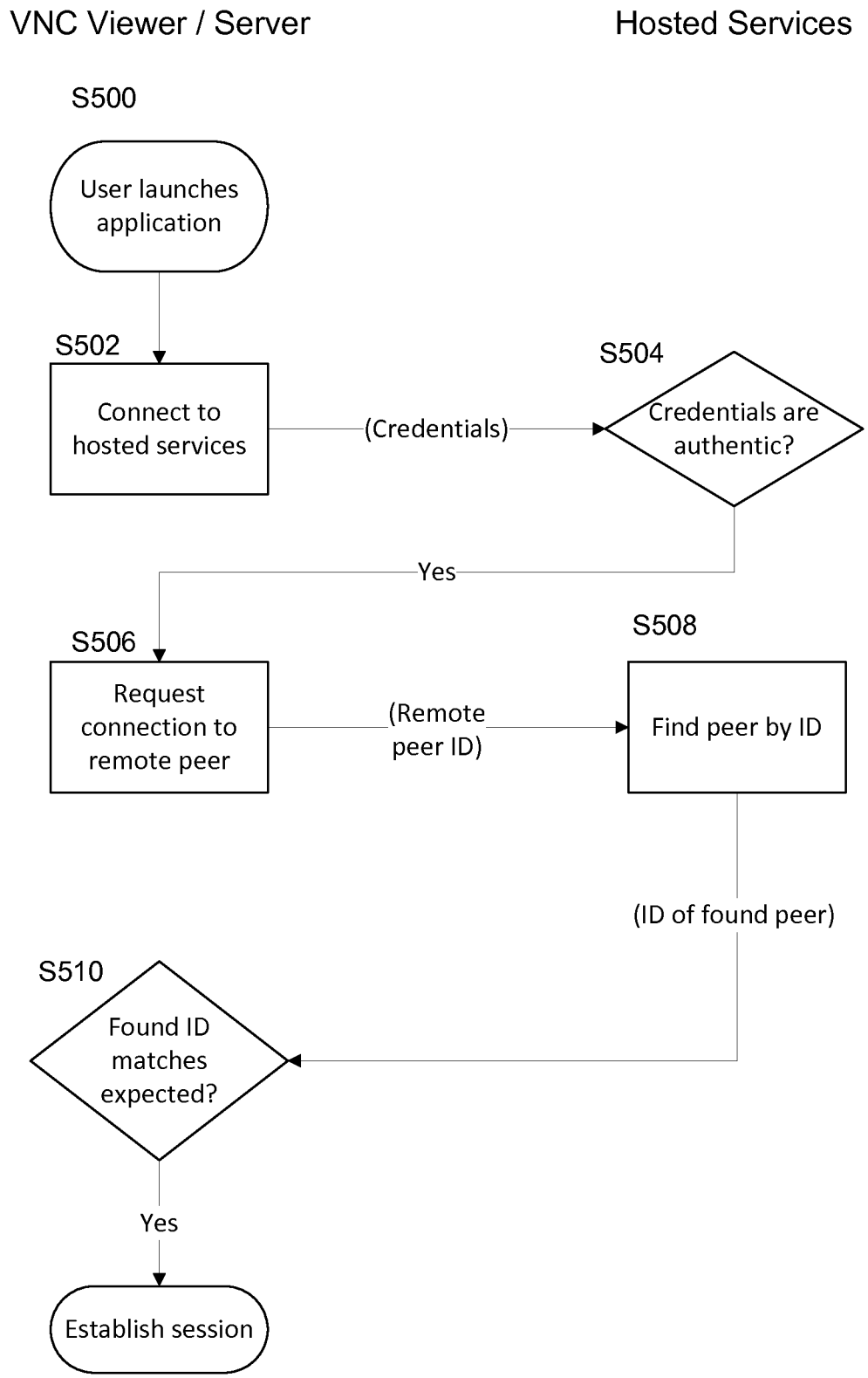
FIG. 5 is a flow chart showing how trust is increased by use of a social network.

FIG. 5 shows how the hosted services ensure that a first peer (e.g. the initiator or target) connects to the other peer (e.g. the target if the first peer is the initiator) having a principal that matches the requested peer principal ID. In other words, FIG. 5 expands on step S140 in FIG. 3b. In a first step S500, the VNC viewer/server application is launched which connects them to the hosted services (S502). The credentials (which were preferably bound into the application binary) are sent to the hosted services. The hosted services then verifies that the credentials are authentic (S504). Typically, the verification is done by the core services rather than by the admin services which issues the credentials. The core service checks the received credential against their local information cache which contains an up-to-date copy of the master authentication information from the admin service. A propagate service is used to push the authentication information from the admin service into the local cache of each core service node. If the credentials are not authentic, the connection is terminated. However, if the credentials are authentic, i.e. they match the principal record in the hosted services for that peer, the peer is enabled to request a connection to the remote peer. If a VNC viewer application is launched, the peer is considered to be performing a connection broker request. If a VNC server application is launched, the peer is considered to be performing a rendezvous request.

At step S506, the first peer requests the connection to the remote peer and the ID of the remote peer is sent to the hosted services. There should only be one peer having this ID. The peer is identified by the hosted services (S508) and the ID of the peer which has been identified is sent to the user. However, the hosted services have only checked the credential information for one of the parties in the connection. Accordingly, at step S510, the first peer checks that the ID received from hosted services matches the requested ID. If they match, a session is established.

Thus, the hosted services ensure that a viewer (performing a connection broker request) connects to a server (performing a rendezvous request) with a principal matching the requested peer principal ID. There can only be one such server listening because the hosted services ensure that only one peer can be rendezvousing using a given principal ID at a given time. The viewer double checks that the server principal matches the requested peer principal ID. It is also possible for the viewer to do the rendezvous request and for the server to perform the connection broker request. However, whichever way the system is configured, it is important to note that the hosted services do not ensure that the rendezvousing peer (whether server or viewer) will be contacted only by the requested connection brokering peer (whether viewer of server). Hence the rendezvousing peer will check this for itself and ignore requests to connect from any unexpected principal. For example, this could happen if an initiator has offered to share his screen with more than one peer (which is not supported) and the wrong peer gets there first.

Figure 6:
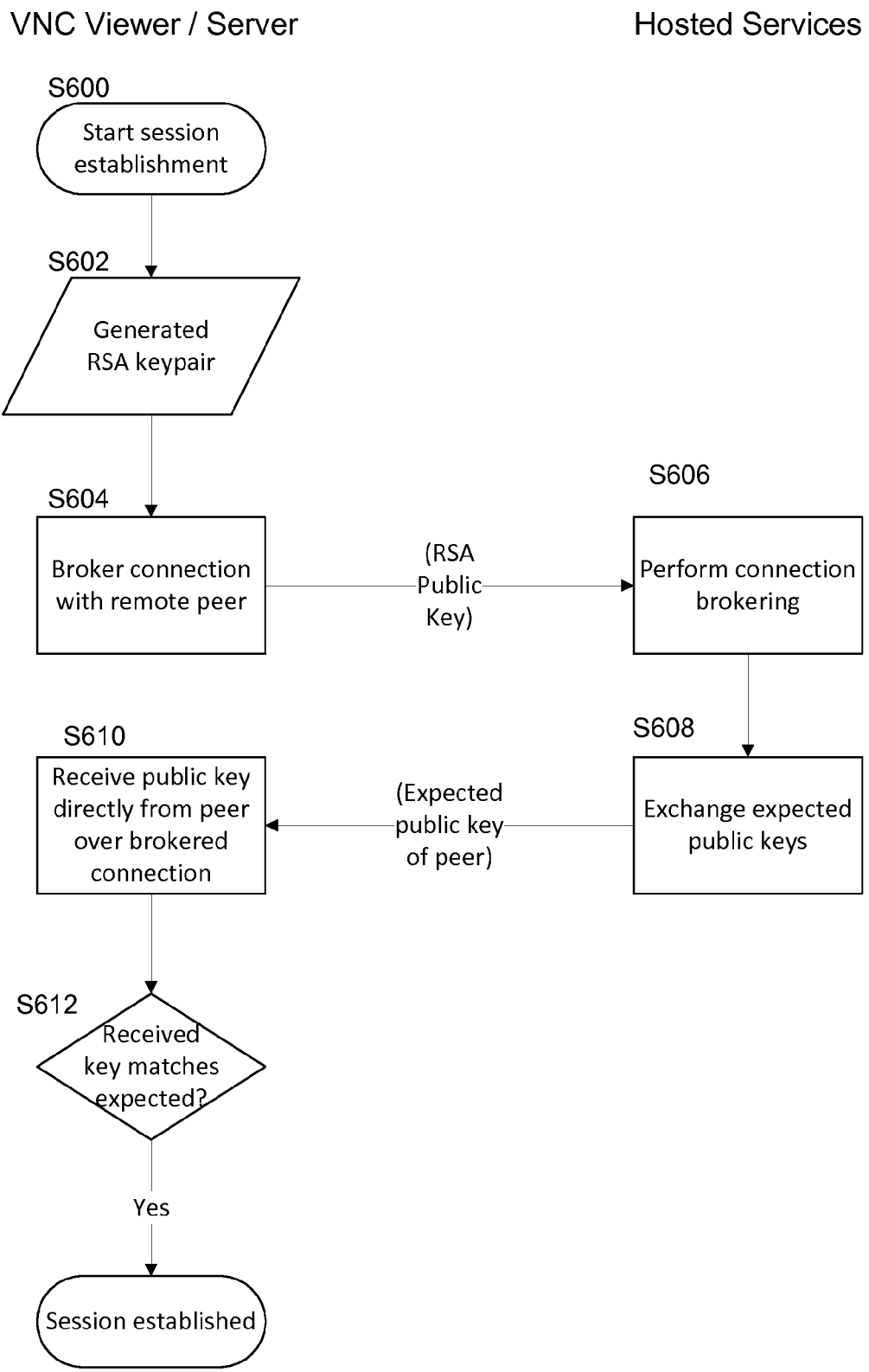
FIG. 6 is a flow chart showing the steps to authenticate a user when establishing a connection.

Ideally any connection between a Viewer and Server should be encrypted. FIG. 6 shows one method of achieving an encrypted VNC connection using RSA. It will be appreciated that other known method of encryption could also be used. At step S602, both the viewer and server applications generate a random RSA keypair at startup. This keypair is used to set up the encryption of the RFB (remote frame buffer) data and is also used as a "fingerprint" to check the identity of the peer application. Typically, AES (Advanced Encryption standard) with a symmetric key is used to encrypt the data and the RSA keypair exchange is used to agree on the shared secret. At step S604, the first peer requests a connection to a remote peer and sends its RSA public key to the hosted services who perform the connection brokering at step S606. The connection brokering is explained in more detail in FIG. 5. The hosted services identify the remote peer to which the first peer wishes to be connected and exchange the RSA public keys of the two parties (S608). The hosted services then transmit the RSA public key of the remote peer back to the first peer. The communications between the hosted services and peers are by a trusted link, e.g. using HTTPS, and the exchange is thus trusted.

At step S610, the public keys are also transmitted directly between the two peers (i.e. between the CSR and subscriber). This exchange may take place via the RFB channel as part of the higher-level VNC connection establishment. It is noted that this exchange may be vulnerable to man-in-the-middle attacks. Accordingly, at step S612, the peer (either server or viewer) checks that the RSA public keys received via the two channels (i.e. via the RFB channel and via hosted services) match thus ensuring detection of a man-in-the-middle attack. If a match is found, the session is established. Otherwise, any connections are terminated. It will be appreciated that other cryptographic information may be used instead of RSA public keys. The key step is that the peer (viewer and/or server) compares the cryptographic data received directly from the other peer with that received from the hosted services and only allows the session if there is a match.

Figure 7:
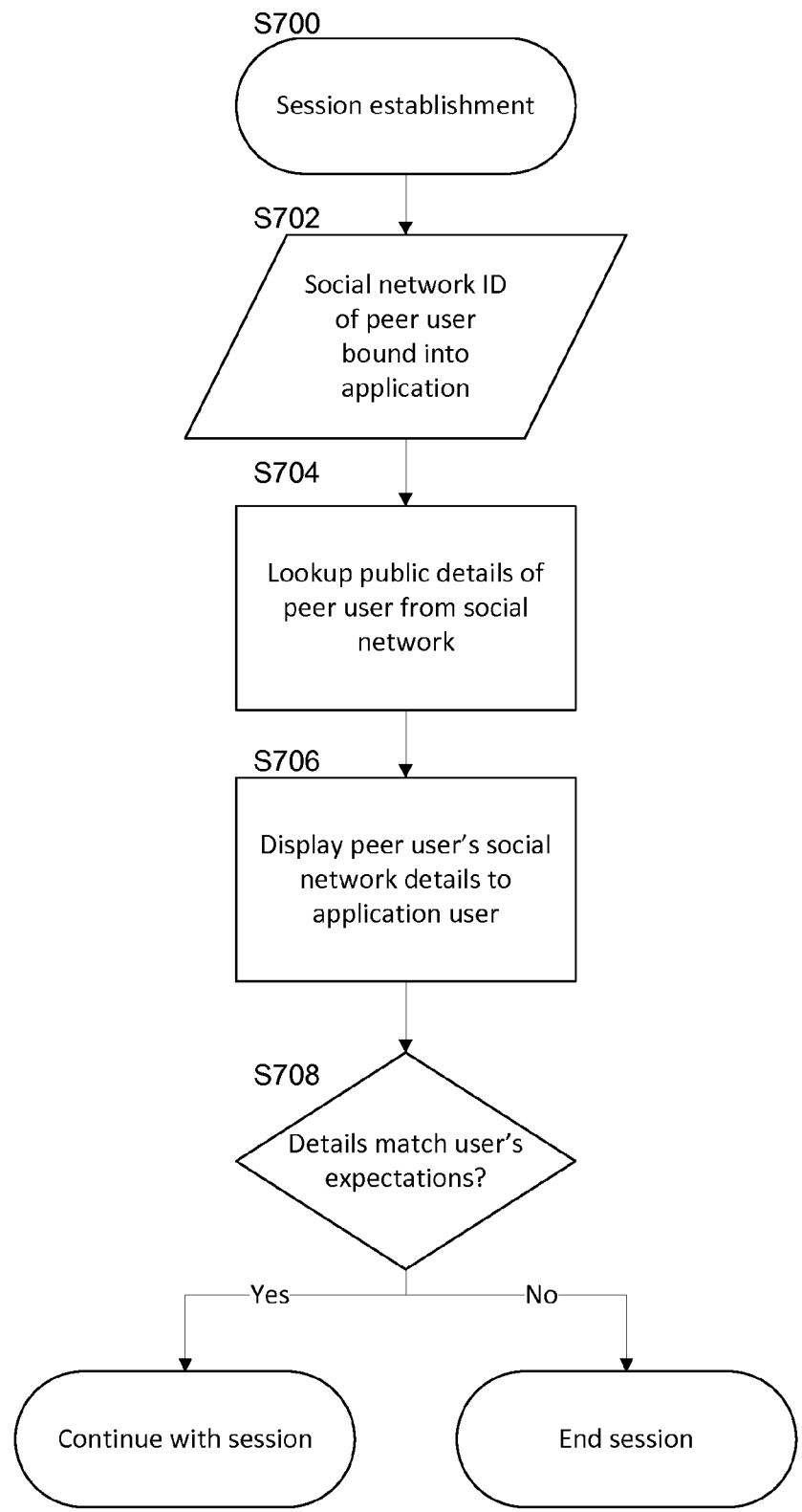
FIG. 7 is a flow chart showing the steps to authenticate a user when finding a remote peer.

As explained above, the viewer and server applications are parameterised with the following connection details which are typically encoded as a connection URL: principal ID, principal password and peer principal ID. FIG. 7 shows how the third party proxy, e.g. Facebook, can be used to enhance security by also including an ID from the third party proxy for both peers. At step S702, the third party ID of the peers are bound into the application (either viewer or server). These IDs are used to look up any public details, e.g. name and picture, of the peer from the third party proxy (S704). Such public details may then be displayed to the other party via the user interface (S706). This gives the user/target the confidence that they are sharing with the desired peer. So at step S708, they can check whether the displayed information matches their expectations and terminate or continue the session as appropriate.

It is noted that viewers and servers have no way to check that the third party proxy IDs do actually match the peer. However, they do have a means of ensuring that they are the same IDs that were provided by the download service as explained by applying tamper proofing techniques described in more detail below.

One option to improve tamper proofing is to ensure that the downloaded executables are signed using an approved method for a given operating system. (Typically this implies using an operating system certificate (e.g. a PKI certificate or similar) supplied by the operating system vendor). The operating system checks this operating system certificate at application startup. If the certificate is not valid, a warning message will be issued. The signature may typically include a hash of all of the code and data in the application. As explained above, some information (i.e. the credential/principal information) may be bound into the downloaded executable and may be referred to as bound data. This bound data may be different for each user and is read by the executable when the executable is run and used to tailor the experience for the user. The bound data may be excluded from the signature and replaced with dynamically configured parameters. Non-parameterised versions of the applications are pre-signed before being installed onto the download services. It is important to avoid signing dynamically for each download as the OS code signing mechanisms are typically cumbersome.

The bound data may also contain a bootstrap configuration for contacting the Hosted Services and also some dynamically configured parameters. The bootstrap configuration enables the loading the software by the computer and thus it would ensure that the Hosted Services are contacted when the software is loaded. In this case, the dynamic parameters may include the connection information (e.g. a uniform resource identifier URI) and any other optional parameters. These may be inserted by the download service. The dynamic parameters are preferably inserted without invalidating the executable signature if this is used as described above.

Another option to improve tamper proofing is to sign the bound data itself by the download service using a certificate designed specifically for the purpose, e.g. a closed-PKI. A corresponding public certificate may be included in the bound data along with a "chain of trust back to root" certificate built in to the application code. Signing the bound data is potentially much more efficient for the download services because the algorithm can be chosen for efficiency. The Viewer and Server applications check the signature of the bound data, and hence can verify that the package contents can be trusted.

Figure 8:
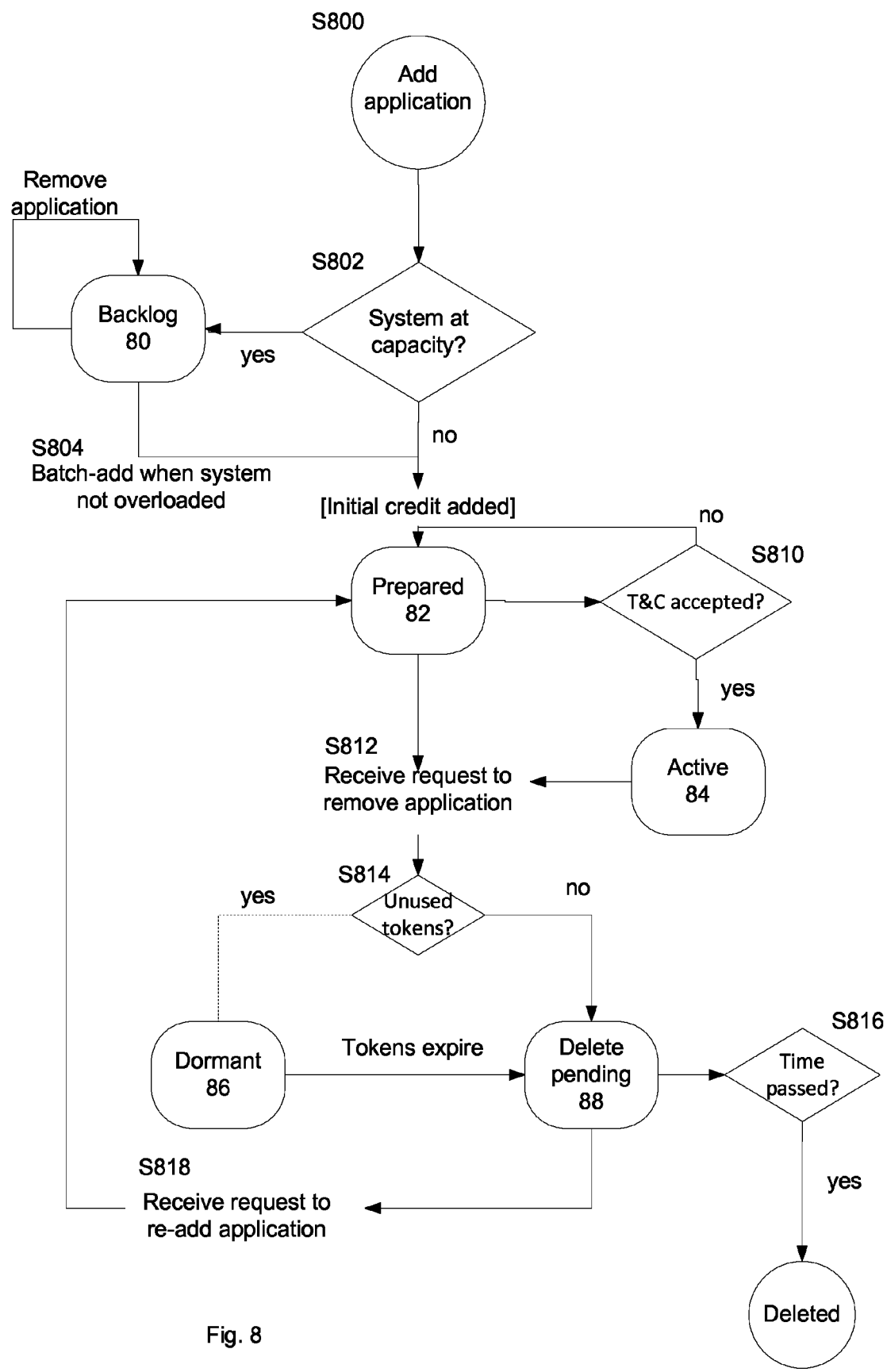
FIG. 8 is a state diagram showing the states of a user account.

As explained in relation to FIGS. 3a and 3b, one option is to create an account for a user and one method for achieving this is shown in FIG. 8. A first step S800 is for a user to add the helpdesk application to their social network platform (or other third party proxy), e.g. Facebook. They may be asked to accept any terms and conditions from the third party proxy when adding the helpdesk application. Step S802 is an optional step which provides for the possibility that the system is at capacity or unable to accept new accounts. As shown, when there is no capacity, the user's details are kept in a backlog state 80. When the system capacity is increased, and new accounts are being accepted, accounts from the backlog are added to the system. The state of the account changes from backlog to prepared. Alternatively, if the system capacity does not increase within a certain time limit, the application may be removed.

When an account is added to the system either immediately on request or from the backlog state (S804), it is added in the 'prepared state' 82. An optional step is to grant some initial credit/tokens/entitlement to use the service for a particular period of time (e.g. as a promotional consideration). As shown at step S810, when the user accepts the helpdesk service terms and conditions (T&C), the account is put into the active state 84. Otherwise, the account remains in the prepared state 82. Users can make use of the helpdesk service only if their account is in the active state 84, and they have enough credit/tokens/entitlement to do so.

If the user removes the helpdesk application (S812) from their account in the third party proxy, their account is put into one of two states depending on whether they have any outstanding credit (S814):

a. If they do have outstanding credit, their account is put into Dormant state. Re-adding the account (S818) will put them back into pending state, with their outstanding credit preserved, but without granting them additional initial promotional credit. If their outstanding credit expires before they re-add the account, their account moves into 'Delete Pending' state.

b. If the user does not have any outstanding credit, their account is put into a 'Delete Pending' state. A user's account is kept in this state for a period of time, e.g. 6 months, after which it may be finally deleted from the system (S816). If the user re-adds the account from this state (S818), they are put back into the pending state, but they are not granted any initial promotional credit. This is to prevent users from 'gaming' the system.

An account may be removed from the system if it has been in the delete pending state for more than a period of time, e.g. 6 months. If the user re-adds the application once their account is deleted, they are treated in the same way as a new user, and start this flow again.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method comprising:
receiving, at a social network provider system that provides a social network, a virtual network connection request from an initiating computing device operated by an initiator who is a member of the social network, the virtual network connection request identifying a target computing device operated by a target who is also a member of the social network, the initiator and the target having a pre-existing relationship as friends on the social network, the virtual network connection request including a request for a virtual network connection between the initiating computing device and the target computing device to enable one of the initiating computing device or the target computing device to control the other;
requesting, by the social network provider system, initiator credentials for the initiating computing device;
requesting, by the social network provider system, target credentials for the target computing device;
provisioning, by the social network provider system, the virtual network connection with the initiator credentials and the target credentials, wherein at least one of said initiating computing device and said target computing device verifies that said credential for the other of said initiating computing device and said target computing device matches the expectations of said initiating computing device and said target computing device; and
using the initiator credentials and the target credentials to initiate the virtual network connection between the initiating computing device and the target computing device, wherein the virtual network connection established between said initiating computing device and said target computing device is encrypted.

2. A method according to claim 1, wherein the initiator credentials are selected from a set of pre-computed credentials.

3. A method according to claim 1, wherein the target credentials are selected from a set of pre-computed credentials.

4. A method according to claim 1, wherein cryptographic data used to encrypt the virtual network connection is compared to verify whether it matches cryptographic data received from the social network provider system.

5. A method according to claim 1, wherein the credentials include ID and/or picture of said target or initiator.

* * * * *